May 23, 1967  P. M. ANDERSEN ETAL  3,321,149

CHART ROLL SPINDLE

Filed March 24, 1966

PETER M. ANDERSEN
FRITS KUYT
*INVENTORS*

BY *Lowell J. White*

ATTORNEY 3,321,149
CHART ROLL SPINDLE
Peter M. Andersen and Frits Kuyt, Rochester, N.Y., assignors to Bausch & Lomb Incorporated, Rochester, N.Y., a corporation of New York
Filed Mar. 24, 1966, Ser. No. 537,082
3 Claims. (Cl. 242—74)

The present invention relates to a novel chart roll spindle for use with recorders in which a drum type chart roll is used for takeup and playout of a strip chart. In particular, this invention relates to a novel spool or spindle in which an area of adhesive composition is applied to an outer surface of the spindle to facilitate attaching chart paper to the spindle during operation of the recorder. This invention provides a means for using the chart roll spindle during playout of the strip chart and thereafter utilizing the empty spool as a takeup spindle wherein a new adhesive surface is exposed for attaching chart paper for takeup.

Numerous instruments record plots in which a pen traverses a record thereon while the chart moves linearly at a predetermined speed. Ordinarily these instruments provide a strip chart of given length in a roll form disposed around a spindle. These spindles are provided with means for rotating the takeup roll at sufficient speed to assure a tight rewinding of the chart after it has passed the writing portion of the instrument. After recording for a time the chart is expended and the used chart is then rolled on the takeup reel or spindle. Frequently it is desired to use the empty playout spindle on which the chart was supplied to the instrument as a takeup spool for the next chart. In many instances the original chart is secured to the spindle by an adhesive. In removing the original chart from the playout spindle the adhesive properties are destroyed, usually by tearing of the paper or matting of fibers onto the adhesive surface. It has generally been found that such adhesives may not be reused effectively to secure the new chart to the spindle when it has been placed in position as a takeup reel.

It has been discovered that an effective chart roll spindle can be provided wherein an adhesive area may be exposed between the time the playout reel has been removed and inserted as the take-up reel. This can be accomplished by providing a flexible non-adhesive layer overlying portions of an adhesive material on the outer surface of the chart roll spindle.

Accordingly it is an object of this invention to provide a chart roll spindle for a drum type chart playout and take-up chart drive having a cylindrical tube with a thin layer of tacky adhesive material disposed in an area on the outer surface of the tube and having a thin non-adhesive release layer overlying portions of the adhesive material. In this manner a first chart may be held adhesively to the spindle tube during playout of the chart and a second chart may be attached to the expended spindle tube during chart take-up merely by removing the non-adhesive layer and securing the new chart to the tube by applying light pressure. These and other objects and features of the present invention will be seen from the following description and drawing wherein:

Figure 1:
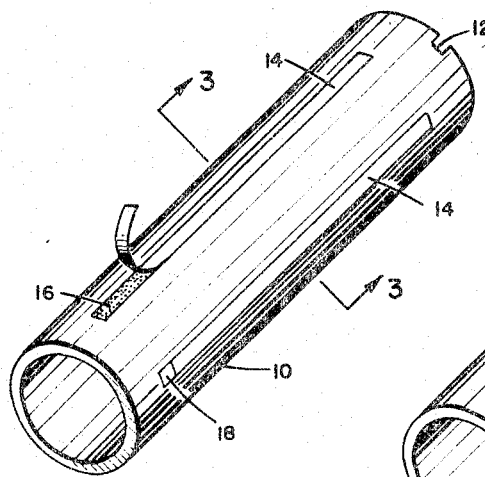
FIGURE 1 is a perspective view of a spindle tube according to the present invention.

Referring now to the drawing, FIGURE 1 shows a cylindrical chart roll spindle 10 having a means for connection to a rotary drive such as insert groove 12 and having disposed on an outer surface of the spindle tube in a direction substantially parallel to the cylindrical axis of the tube a plurality of discrete adhesive areas having removable non-adhesive layers 14 disposed on an adhesive composition 16 which has been coated directly onto the spindle surface in thin elongate sections. A short tab 18 extends past the coated adhesive surface 16 to faciliate removal of the non-adhesive layer 14. Only one of the non-adhesive layers 14 is necessary since ordinarily a chart roll is supplied by a manufacturer in which the chart paper is previously attached to a core such as spindle 10. Only one area need be exposed by stripping after using the original chart.

Figure 2:
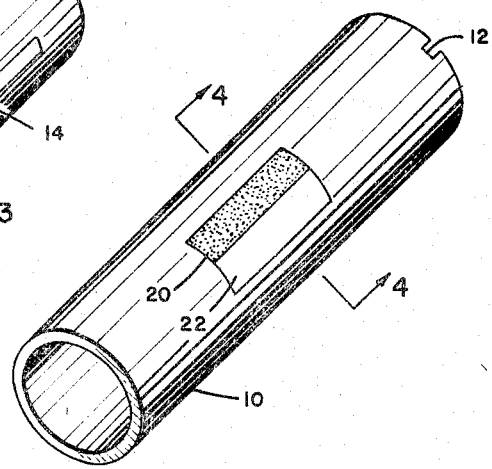
FIGURE 2 is a perspective view of a preferred modification of the chart roll spindle.

In FIGURE 2 there is shown the preferred embodiment of the present invention. The chart roll spindle 10 has disposed near the middle surface an adhesive area 20 having a non-adhesive layer 22 overlying portions of the adhesive area 20. In this embodiment the adhesive material is secured to the tube surface by use of a tape having adhesive composition on opposite sides, so that one side adheres to the tube surface and the opposite side 20 adheres to the chart. Typically for a 5" spindle tube (longitudinal dimension), a tape ½" in width and 1" in length may be applied to the outer surface of the tube by pressure. The tape may have originally comprised a split cover in which a matching portion about ¼" wide is removed to expose area 20 while the remaining non-adhesive layer 22 remains until it is removed to secure a second chart to a takeup roll.

Figure 3:
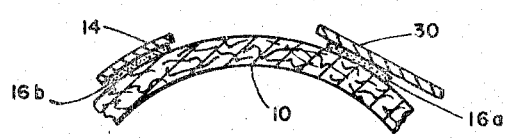
FIGURE 3 is a cross sectional view, partially cut away, of the spindle of FIGURE 1.

In FIGURE 3 there is shown a cross-sectional view of the embodiment shown in FIGURE 1 wherein original paper chart 30 is shown attached to the spindle tube 10 by an adhesive layer 16. After the original chart has been used chart 30 is removed, thereby destroying the adhesive properties of layer 16a. In order to secure a new chart to the spindle tube it is then necessary to strip non-adhesive layer 14 from the second portion of the adhesive material 16b, exposing a fresh surface to which the new chart may be attached by pressing the paper against adhesive 16b.

Figure 4:
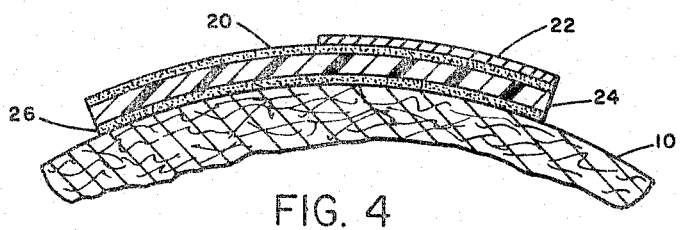
FIGURE 4 is a cross sectional view, partially cut away, of the spindle shown in FIGURE 2.

In FIGURE 4 there is shown an enlarged cross-section of the preferred embodiment of this invention wherein a thin tape 24 such as Mylar or other suitable flexible film has been coated with a first adhesive layer 20 and a second adhesive layer 26. A short strip of this tape is applied to the surface of spindle tube 10 by pressure and about ½ of the surface of outer adhesive layer 20 is covered by a thin removable non-adhesive layer 22. This may be made of numerous materials such as resin film, or wax-impregnated paper. The important property of the release paper 22 is the lack of adhesion and easy delamination between layers 20 and 22. The original chart is secured to the spindle tube 10 by pressing the paper onto surface 20 and rolling the chart to a predetermined length. After playout of the original chart, flexible layer 22 is removed, exposing a fresh portion of adhesive material.

In securing the original roll to the spindle having an adhesive tape, attention should be given to the roll direction during chart removal. If the original roll is wound clockwise as shown in FIGURE 4, the leading edge of the tape may be delaminated from the spindle rather than the chart when the end of the original chart roll is reached. By winding counterclockwise, the initial stripping of the chart paper from the spindle commences at the adhesive area 20 at the center of the tape beside layer 22. At this point the pull of the original chart will not delaminate the tape.

The adhesive compositions used with the spindle of the present invention may be made from numerous tacky substances. Typical adhesives are polyvinyl alcohol, poly-isobutylene, numerous elastomers, or compounds having poly-hydric groups.

While the present invention has been described by specific example there is no intention to limit the invention except as set forth in the following claims.

We claim:

1. A chart roll spindle for a drum-type chart playout and take-up chart drive comprising
a cylindrical spindle tube having means for connection to a rotary drive means, said spindle tube having disposed on an outer surface means for adhesively attaching a first chart including a thin layer of tacky adhesive material, and a thin removable non-adhesive layer overlying portions of the adhesive material, whereby a first chart may be held adhesively to the spindle tube during playout of the chart and a second chart may be attached to the spindle tube during take-up by removing the non-adhesive layer and securing the chart to the spindle tube by light pressure.

2. The chart roll spindle of claim 1 wherein the adhesive material is applied to discrete portions of the spindle tube outer surface in thin elongate sections substantially parallel to the cylindrical axis of the spindle tube.

3. The chart roll spindle of claim 1 wherein the adhesive material comprises a tape having adhesive composition on opposite surfaces.

References Cited by the Examiner

UNITED STATES PATENTS

| | | | |
|---|---|---|---|
| 2,676,765 | 4/1954 | Kaplan | 242—68.5 |
| 2,900,868 | 8/1959 | Gaffney | 242—74 X |
| 3,030,045 | 4/1962 | Rehklau | 242—74 |

STANLEY N. GILREATH, *Primary Examiner.*

N. L. MINTZ, *Assistant Examiner.*